United States Patent Office 3,560,423
Patented Feb. 2, 1971

3,560,423
LUSTER OF FIBERS CONTAINING SOLID PARTICULATE MATERIALS
Raymond Adrian Levesque, Joppatowne, Md., and Richard Frederick Schmidt, Stamford, Conn., assignors to American Cyanamid Company, Stamford, Conn.
No Drawing. Filed Feb. 6, 1968, Ser. No. 703,260
Int. Cl. C08f *45/04, 45/24;* C08g *51/02*
U.S. Cl. 260—29.6                              9 Claims

ABSTRACT OF THE DISCLOSURE

A composition useful for the preparation of shaped articles comprising a synthetic organic polymer, a solvent medium capable of dissolving said polymer, finely divided particulate solids coated with an organic liquid, said liquid being insoluble in and immiscible with the polymer solution. The liquid coating has a viscosity in the range of from about equal to the polymer solution viscosity to less than that which interferes with shaping. This composition can be wet-spun in a manner to produce lustrous fibers containing the coated particulate solids in agglomerate form.

---

This invention relates to a process for producing shaped polymeric articles, to compositions useful in the process, and to the shaped articles produced thereby. More particularly, this invention relates to a process for producing fibers of good luster from spinning dopes containing dispersed particulate solids which are prevented from acting as delustrants, by virtue of their having been treated with a viscous immiscible material.

Organic polymers from which commercial fibers are formed generally have the ability to produce inherently lustrous fibers since the desirability of lustrous fibers for many purposes is well-known. It is known to modify the properties of synthetic fibers by mixing additives with the polymer prior to forming fibers therefrom. Materials such as flame retardants, bacteriostats, pigments, stabilizers, brighteners and the like are very often blended with the polymer to obtain a desired modification. In many cases these materials are available as solids, and they are incorporated with the polymer in particulate form. However, presently available processes for incorporating particulate solids in the polymer result in a significant reduction of the luster of the resultant fibers. Thus, the fibers have less apparent luster and, in effect, are unintentionally delustered due to the incorporation of these particulate solids. In many instances it is highly desirable to effect the desired modification through incorporation of particulate solids, without loss of fiber luster.

There exists, therefore, the need for fibers of organic polymers which can have solid particulate materials dispersed therein and still retain a desirable degree of luster.

It is an object of the present invention to provide a process of producing polymeric shaped articles, such as fibers, having particulate solids dispersed therein without adverse effect upon fiber luster. It is a further object of the present invention to provide spinning compositions from which lustrous fibers having particulate solids incorporated therein, can be produced. It is a further object of this invention to provide lustrous fibers having particulate solids incorporated therein. Further objects of this invention will become apparent from the following detailed description.

It has now been discovered that synthetic fibers of organic polymers containing dispersed particulate solids and having high luster are obtained when the solids are dispersed in accordance with a particular distribution pattern. The pattern is such that at least about 75% of the solids are clustered into a small number of aggregates occupying well-spaced intervals within a unit volume of said fiber and leaving intervals between said aggregates within said unit volume essentially free of said particles. The desired property modifications of the fibers for which the solids are incorporated are obtained in essentially the same degree as when they are added by conventional methods. The distribution pattern leading to improved luster is readily achieved by mixing the spinning composition, prior to forming shaped articles therefrom, with particulate solids coated with an organic liquid which is immiscible with the spinning composition. The results are surprising in view of the fact that the organic liquid is neither a solvent for the solid material nor soluble in the spinning composition. Furthermore, the results obtained are surprising in that only certain organic liquids are effective and no co-relationship between refractive indices of effective liquids and fiber appears to exist. In fact, once the desired distribution of solid particulate material within the fiber has been achieved, the presence of the organic liquid is unnecessary.

While the invention will be described hereinafter with reference to fiber production, it is to be understood that it is not limited thereto but is intended to include the production of lustrous articles of whatever shape from organic polymers having solids dispersed therethrough.

According to the present invention, a fiber spinning composition comprising an organic fiber-forming polymer and specially treated particulate solids dispersed therein is prepared. The treatment of the solids consists of admixing the solids with an organic liquid which is not a solvent for either the particles or the polymer and is immiscible with, and has a viscosity at least equal to, the spinning dope. The fibers are then spun by conventional techniques with the result that the particulate solids are non-uniformly dispersed, in the form of agglomerates, in the fibers. The resultant fibers possess the desired properties and also the desired degree of luster, notwithstanding the presence of dispersed solids therein.

The organic polymers from which fibers can be spun in accordance with the present invention are any that are normally capable of forming lustrous fibers. Among these are: polyamides, polyesters, polyolefins, acrylics, methacrylics, polyurethanes, cellulose esters and cellulose ethers, and the like. Polymers of acrylonitrile, i.e., polymers containing at least about 70% of acrylonitrile and the balance of one or more comonomers copolymerizable therewith, are particularly useful herein.

The particular method employed in spinning the organic polymers into fibers is not critical and the appropriate conventional methods of wet, dry, or melt spinning can be employed as long as the coated solid particulate material can be incorporated into the spinning compositions and the desired distribution of solid material in agglomerates within the fiber is obtained. A particularly effective method, involving the preferred polymer, is one comprising extrusion of a solution of the organic polymer in appropriate solvent, through a spinneret into a coagulating bath, said process being referred to as a wet spinning method.

The nature of the fiber is not critical in the present invention except that it inherently should possess internal luster as discussed above. The fibers may be formed of single or multi-components and still be effectively improved according to the present invention. The fibers may also be further treated as for example crimped, bulked, or textured while retaining high luster. In applications involving fibers having more than one component, it may be desired to incorporate the particulate solids into each of the various spinning compositions at the effective levels. In other applications of similar fibers, the particulate solids may be advantageously incorporated into only one of the spinning compositions employed. While this means of incorporation may somewhat deluster the fibers, the present invention is still applicable and results in reduced delustering.

The particulate solids that may be employed in the present invention are any that are capable of effecting a desirable modification of fiber properties, but are not expressly employed for the purpose of delustering. Although it is not intended to exclude those solid materials normally employed as delustrants from the scope of the present invention when used for other purposes, it should be understood that their effectiveness as delustrants per se would be defeated by the present invention. The particulate solids may be flame retardants, anti-bacterials, pigments, thermal stabilizers, light stabilizers, brighteners, and the like. For example, solid particulate flame retardants such as bis(pentabromophenyl)ether, perbromobicyclodecane, tetrabromophthalic anhydride, and hexabromobenzene, can be effectively employed in the process of the present invention. Solid anti-bacterials include triphenyl bismuthine, triphenyl bismuth dichloride, and various carbanilides. Pigments include phthalocyanines, coumarins and quinacridones. Thermal stabilizers include tin and other metal soaps. Light stabilizers may be characterized by 3,5-di-tertiary butyl-4-hydroxybenzyl ether and 2-hydroxy-4-methoxybenzophenone.

The concentration of the particulate solids in the spinning composition will be the effective concentration normally employed in the absence of the organic liquid coating used in this invention. The concentration varies among additive types and with the desired degree of property modification. In cases where the particulate solids are flame retardants, for example, effective concentrations may range from about 1 to about 25% based on the weight of the polymer, depending upon the particular flame retardant employed and the degree of flame retardancy desired. It is intended that a mixture of several particulate solids may be employed to effect one or more property modifications of fiber properties, depending upon the mixture chosen. While it is possible that certain compounds within the class of particulate solids previously described may be effectively used within the fibers without organic liquid at sufficiently low concentrations so as not to have significant effect upon fiber luster, the use of combinations thereof for improved or additional property modifications results in higher total use concentrations and the resulting adverse luster effects. The present invention, therefore, has the added feature of enabling such combinations to be effectively used while still maintaining a high degree of luster.

The particle size of the solid materials employed in the present invention will of necessity be small because of the limitations of the equipment and fiber involved. Thus, the particles should be small enough to pass through the orifices of the spinnerets and make up less than a cross-section of the formed fiber and thus should be smaller than 15 microns. It is preferred to use particles of extremely small particle size, less than about 5 microns, since they are more readily coated and allow for aggregation to occur without exceeding the size limitations noted previously.

The organic liquids that may be employed in coating the particulate solids should have a viscosity at least about equal to that of the spinning composition, should be immiscible with the spinning composition and should not dissolve either the polymer or the particular solids. Those which have significantly lower viscosities than the polymer are not effective. The only upper limit of viscosity is that the viscosity of the coating liquid should not be so high that the agglomerated particles are separated from the spinning composition when passing through the spinneret orifices. Generally useful coating agents are characterized by viscosities within the range of 1,000 and 100,000 centipoises at the fiber formation temperature. The choice of a particular organic liquid coating agent will vary with the polymer, the spinning compositions, and the spinning processes employed, but so long as it meets the foregoing requirements, as can be determined by simple test procedures, any can be used. Effective organic liquids employed as coatings for particulate solid fire retardants in spinning compositions comprising a polymer of acrylonitrile dissolved in an aqueous salt solution, include tris(2,3-dibromopropyl)phosphate, chlorinated paraffins, poly(alpha-methylstyrene), and chlorinated polyphenyls.

The amount of organic liquid coating may be, generally, in the same weight range as the solid particulate material; however, from about one-fourth to about four times this amount may be used. It is important that a sufficient amount of the organic liquid be employed to coat substantially all solid particles and provide sufficient mobility thereto to insure an aggregation within the formed fiber. In certain instances, the organic liquid may supplement the solid particulate material in achieving particular property modifications rather than merely being a coating therefor. In such instances, total usage of solid and liquid is adjusted accordingly.

In carrying out the present invention, the particulate solids are first coated with the organic liquid by thorough mixing. The method of mixing is not a critical feature of the present invention and mixing can be carried out in a variety of mixing devices including ball-mills, blenders, mixers, agitators, and the like. It is, of course, possible to mix the solid particulate material with the organic liquid in the presence of the spinning dope of the organic polymer, but because of the competition between polymer and organic liquid as coating media, the length of time required for proper coating in such instances, and the uncertainty as to when, if at all, the proper coating has been achieved, it is greatly preferred to effect said coating apart from the spinning dope. The coated particles should contain sufficient liquid coating to exhibit mobility and coalescence in the spinning dope.

After the particulate solids are coated with the organic liquid, they are added to the spinning dope in suitable concentration. The manner in which the coated particles insofar as it determines ultimate distribution within the formed fiber. It is important that regardless of the method of incorporation, the particles remain in intimate contact with the coating liquid and that coalescence of said liquid occurs to the extent that numerous globules thereof exist throughout the spinning composition. These globules of organic liquid containing the solid particulate material should be sufficiently small as to pass through the orifices of the spinnerets and form less than a cross-section of the fiber being spun, but may be as close to the these dimensions as possible as long as they do not adversely affect fiber properties. The distribution of the globules within the spinning composition should be such that they occur at randomly spaced intervals within said composition. A random arrangement of fewer globules of larger size is greatly preferred over a homogeneous dispersion of many globules of smaller size. Such incorporation may be by any convenient means although it is generally preferred to inject said particles into a stream of the spinning composition flowing to the spinnerets in conjunction with agitating means which can be regulated to achieve the desired distribution and the pumping force to move the stream toward the spinnerets. The speed and shear rate of agitation will vary widely depending upon numerous factors including polymer type, spinning method, relative viscosities of spinning composition and organic liquid used as coating, and the amount of solid particulate material being incorporated into the spinning composition. Where spinning compositions have viscosities in the range of 2,500 and 7,500 centipoises and the organic liquid is in the same range, suitable agitation may generally be obtained with a low shear means operating at about 300 to 700 revolutions per minute.

This optimum distribution within the fiber is such that within an average unit volume of said fiber, at least 50% of the space within said unit volume is continuous and unoccupied by solid particles; and approximately at least 75%, preferably from about 80 to about 90 percent, of all of the coated particulate solids present within said volume are clustered in close association to occupy less than about 10% of said unit volume. The remainder of the particulate solids should have only a minor portion in essentially unassociated form and a major portion forming small aggregates well-spaced from the large aggregate referred to previously and occupying not more than 30% of the total space within said volume.

With the exception of the addition of the particulate solids in the manner and condition indicated, the process of fiber-making generally proceeds according to conventional procedures for the particular fiber type being processed. It is to be understood that desirable features in yarns are sometimes obtained by fiber-blending and such blending has application with the present invention. In the case of fiber blending, however, additional latitude in the use of the solid particulate materials is possible. For example, five times the normal effective level of a solid particulate material may be incorporated within a particular fiber according to the present invention and then that fiber may be blended with other similar fibers not containing said additive such that a 1:4 blend is achieved which has the desired property modifications for which the solid material is incorporated and has improved luster over that obtained by conventional methods of incorporating solids. In certain instances, the blending, per se, may accomplish improvements in luster of the final yarn, but use of the present invention will result in still further improvements.

The following examples more fully illustrate the present invention and are not intended to limit the same.

The method of assessing fiber luster in the following examples comprises making a series of loops of dyed yarns and inserting a number of cut ends of the same yarn as a core within the loops and then noting the nature of the contrast produced. Other fiber properties are determined according to standard test procedures.

EXAMPLE 1

A bi-component fiber is spun according to conventional procedures employing wet spinning techniques. Two copolymers are employed, the first containing approximately 89.2% of acrylonitrile and 10.8% of methyl methacrylate and the second containing 91.7% acrylonitrile and 8.3% methyl methacrylate. In the bi-component fiber formed there is approximately 72% of the first copolymer and 28% of the second. The spinning dopes of each copolymer have the following composition:

| | Parts |
|---|---|
| Copolymer | 112 |
| Sodium thiocyanate | 400 |
| Water | 488 |

The viscosities of the spinning dopes are similar, ranging from about 5,000 to about 5,500 centipoises at 23° C. when measured with a Brookfield viscometer. The coagulating bath employed comprises essentially a 12% solution of sodium thiocyanate in water at 3° C. A high degree of luster inherent in the fiber was indicated by the high contrast between loops and ends of yarns made from said fiber.

This example represents a control wherein no particulate solids are incorporated into the spinning dope and serves as a basis for comparison of fibers produced in subsequent examples.

EXAMPLE 2

This example shows the result of conventional methods of incorporating solid particulate materials into spinning dopes.

The bi-component fiber is spun in the same manner as in Example 1, except that approximately 7.1% of bis(pentabromophenyl) ether based on the weight of the copolymer is incorporated into the spinning dope employed in a 28% concentration. A bi-component fiber is produced having about 2% solids based on the total fiber formed. A low degree of luster inherent in the fiber was indicated by the lack of contrast between loops and ends of yarns made from such fiber. The fiber had a highly desirable flame retardancy not possessed by the fiber of Example 1.

EXAMPLE 3

This example represents an embodiment of the present invention.

The bi-component fiber is spun in the same manner as in Example 1, except that approximately 7.1% of bis(pentabromophenyl) ether is previously coated with an equal weight of tris(2,3-dibromopropyl)phosphate. The tris(2,3-dibromopropyl)phosphate, having a viscosity of 6450 centipoises at 23° C. measured with a Brookfield viscometer, is incorporated into the copolymer employed in an amount of 28%, by injection into an in-line mixer through which said stream passes and employing low shear agitation at about 450 r.p.m. A high degree of luster inherent in the fiber is indicated by the high contrast between loops and ends of yarns made from such fiber. The luster is essentially the same as that of the fiber obtained by Example 1 and the flame retardancy equal to that of the fiber obtained by Example 2.

EXAMPLE 4

This example shows that coating liquids of insufficient viscosity are ineffective in the present invention.

The procedure of Example 3 is followed except that an equal amount of tricresyl phosphate is substituted for the tris(2,3-dibromopropyl)phosphate therein. The viscosity of tricresyl phosphate is 55 centipoises measured at 23° C. with a Brookfield viscometer. In incorporating the coated solid particles into the spinning dope, the tricresyl phosphate is displaced by polymer solution as coating medium. A low degree of luster inherent in the fiber is indicated by the low contrast between loops and ends of yarns made from such fiber although the flame retardancy is essentially equal to that of the fiber obtained by Example 2.

EXAMPLE 5

This example shows that coating liquids of excessive viscosity are ineffective in the present invention.

The procedure of Example 3 was followed except that an equal amount of styrenated polyester is substituted for the tris(2,3-dibromopropyl)phosphate therein. The polyester had a viscosity in excess of 100,000 centipoises when measured at 23° C. with a Brookfield viscometer. This coating liquid is too viscous to pass through the orifices of the spinnerets and holds back the solid material as well. The fiber formed has no solid additive dispersed therein and consequently has the properties of the fiber obtained by Example 1.

EXAMPLE 6

This example represents an embodiment of the present invention employing a different coating liquid.

The procedure of Example 3 is followed except that an equal amount of poly(alpha-methylstyrene) is substituted for the tris(2,3-dibromopropyl)phosphate therein. Similar results to those obtained in Example 3 are obtained. The poly(alpha-methylstyrene) has a viscosity of 17,620 centipoises when measured at 23° C. with a Brookfield viscometer.

EXAMPLE 7

This example represent still another embodiment of the present invention employing a different coating liquid.

The procedure of Example 3 is followed except that an equal amount of a chlorinated paraffin containing about 70% chlorine is employed. The chlorinated paraffin has a viscosity of 6,600 centipoises when measured at 23° C. with the Brookfield viscometer.

A high degree of luster inherent in the fiber is indicated by the high contrast between loops and ends of yarns made from such fiber. The fiber also possesses a desirable degree of flame retardancy.

We claim:
1. A spinning composition useful for spinnning into lustrous fibers comprising a liquid fiber forming organic polymer composition capable of forming an inherently lustrous fiber and containing a finely divided particulate solid additive the particles of which are coated with an organic liquid which (a) is not a solvent for either said additive or said polymer, (b) is immiscible with said spinning composition, and (c) has a viscosity at least about equal to the viscosity of said spinning composition.
2. A spinning composition as defined in claim 1 wherein said organic liquid has a viscosity between 1,000 and 100,000 centipoises at the fiber formation temperature.
3. A spinning composition as defined in claim 1 wherein said organic polymer is selected from the group consisting of polyamides, polyesters, polyolefines, acrylics, modacrylics, polyurethanes, cellulose esters, and cellulose ethers.
4. A spinning composition as defined in claim 1 wherein said polymer is a polymer of acrylonitrile dissolved in a solvent for said polymer.
5. A spinning composition as defined in claim 4 wherein said solvent is an aqueous salt solution.
6. A spinning composition as defined in claim 1 wherein said polymer is dissolved in a solvent medium capable of dissolving said polymer.
7. A spinning composition as defined in claim 1 wherein said organic liquid is present in an amount bebetween one-fourth and four times the weight of said paticulate solid additive.
8. A spinning composition as defined in claim 1 wherein said organic polymer is selected from the group consisting of polyamides, polyesters, polyolefines, acrylics, modacrylics, polyurethanes, cellulose esters, and cellulose ethers; wherein said solid additive is selected from the group consisting of flame retardants, anti-bacterials, pigments, thermal stabilizers, light stabilizers, and brighteners; and wherein said organic liquid has a viscosity between 1,000 and 100,000 centipoises at the fiber formation temperature and is present in an amount between one-fourth and four times the weight of said solid additive.
9. A lustrous fiber spun from the spinning composition defined in claim 1.

References Cited
UNITED STATES PATENTS

| | | | |
|---|---|---|---|
| 2,941,970 | 6/1960 | Craig | 260—29.6AO |
| 3,160,600 | 12/1964 | Holsten et al. | 260—34.2X |
| 3,410,819 | 11/1968 | Kourtz et al. | 260—29.6AO |

SAMUEL H. BLECH, Primary Examiner

H. ROBERTS, Assistant Examiner

U.S. Cl. X.R.

106—193, 308; 117—100; 260—13, 30.6, 31, 33.6, 33.8, 34.2, 37, 40, 41; 264—182, 200, 205, 206, 207; 424—78, 81, 83

UNITED STATES PATENT OFFICE
CERTIFICATE OF CORRECTION

Patent No. 3,560,423          Dated February 2, 1971

Inventor(s) Richard Frederick Schmidt & Raymond Adrian Leves(

It is certified that error appears in the above-identified patent and that said Letters Patent are hereby corrected as shown below:

Column 3, line 55, "than 15 microns" should read -- than abo( microns --.

Column 3, line 65, "or particular solids" should read -- or ] culate solids --.

Column 4, line 41, "the coated particles insofar" should rea( -- the coated particles are dispersed in the spinning compos: is important insofar as --.

Signed and sealed this 8th day of June 1971.

(SEAL)
Attest:

EDWARD M. FLETCHER, JR.        WILLIAM E. SCHUYLER,
Attesting Officer             Commissioner of Paten